US006978381B1

(12) United States Patent
Te et al.

(10) Patent No.: US 6,978,381 B1
(45) Date of Patent: Dec. 20, 2005

(54) ENHANCEMENT TO A SYSTEM FOR AUTOMATED GENERATION OF FILE ACCESS CONTROL SYSTEM COMMANDS

(75) Inventors: George A. Te, New Hamburg, NY (US); Edward E. Kelley, Wappingers Falls, NY (US); Norman J. Dauerer, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/427,509

(22) Filed: Oct. 26, 1999

(51) Int. Cl.$^7$ .............................................. H04L 9/00
(52) U.S. Cl. ...................... 713/201; 713/164; 713/166; 713/200; 713/202; 705/54; 705/58
(58) Field of Search ........................................ 713/201

(56) References Cited

U.S. PATENT DOCUMENTS

| | | | |
|---|---|---|---|
| 5,163,147 A | | 11/1992 | Orita |
| 5,263,165 A | | 11/1993 | Janis |
| 5,414,844 A | | 5/1995 | Wang |
| 5,526,428 A | | 6/1996 | Arnold |
| 5,627,967 A | | 5/1997 | Dauerer et al. |
| 5,694,595 A | * | 12/1997 | Jacobs et al. ................... 707/9 |
| 5,748,890 A | | 5/1998 | Goldberg et al. |
| 5,944,825 A | * | 8/1999 | Bellemore et al. .......... 713/202 |
| 6,105,063 A | * | 8/2000 | Hayes, Jr. ................... 709/223 |
| 6,108,712 A | * | 8/2000 | Hayes, Jr. ................... 709/246 |
| 6,237,092 B1 | * | 5/2001 | Hayes, Jr. ................... 713/100 |
| 6,292,904 B1 | * | 9/2001 | Broomhall et al. ............ 714/1 |
| 6,339,826 B2 | * | 1/2002 | Hayes et al. ................. 713/166 |
| 6,587,836 B1 | * | 7/2003 | Ahlberg et al. ............... 705/26 |

* cited by examiner

Primary Examiner—Kambiz Zand
(74) Attorney, Agent, or Firm—Whitham, Curtis & Christofferson, P.C.; John J. Cioffi

(57) ABSTRACT

A secure data processing system having a plurality of resources accessible over a network arrangement such as the Internet and including a server, maintains lists of three categories of access authorization information. A resource list contains path or location information such as a universal resource locator (URL). A profile list maintains a plurality of profile data specifying individual resources or combinations of resources. A user list contains a userID or other data by which a user may be authenticated to the server and one or more profiles freely assignable to respective users. An access control program allows administrator supervision of editing of the lists of user access authorization information. An authorization program performs authorizations to resources for all users based on the profile information of respective users upon completion of editing. A user is authenticated by the server upon communication by the user to the server and user requests of authenticated users to resources for which authorization has already been performed in accordance with the path or location information in the resource list.

37 Claims, 16 Drawing Sheets

USER TABLE

| USERID | PROFILE | RESOLVE | SERIAL # | NAME | DEPT | EMAIL | MGR-EMAIL | ETC..... |
|---|---|---|---|---|---|---|---|---|
| JANE | AA BB | MAX | 558732 | HUTSON, JANE | FNST | JANE@ XX.NET | KEEP@ XX.NET | |
| GREG22 | CC | MIN | 621134 | THOMS, GREG | NLNV | GRE@ YY.COM | PAM@ SS.NET | |
| DAVID | DD EE FF | MIN | 231256 | FOX, DAVID | NLNV | DAV@ YY.COM | PAM@ SS.NET | |
| PEGGY | AA CC | MAX | 812934 | ANDER, PEG | FNST | PEG@ GYR.NET | KEEP@ XX.NET | |

FIG. 13

PROFILE TABLE

| PROFILE | DESCRIPTION | DB/AST | ACC | DB/AST | ACC | DB/AST | ACC | DB/AST | ACC | ETC.... |
|---|---|---|---|---|---|---|---|---|---|---|
| AA | MFG FRONT LINE ENGIN. | 193 | U | 194 | R | 195 | R | | | |
| BB | DESIGN ENGINEERING | 194 | U | 195 | U | 199 | R | 220 | R | |
| CC | MID LINE OPERATOR | 220 | R | 340 | R | 355 | R | SPEC.TXT | R | |
| DD | IS-9000 DOCUMENTS | 880 | R | ISO9000 | R | | | | | |
| EE | XYZ COMPANY NFO | 901 | R | 902 | R | 903 | R | 904 | R | ...ETC....> |
| FF | PATENT DATABASE | 988P | R | | | | | | | |
| GG | ....ETC..... | | | | | | | | | |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |

FIG. 14

DB/ASSET TABLE

| DB/ASSET | DESCRIPTION | PATH (TO DB/ASSET) |
|---|---|---|
| 193 | TOBI PROCESS SPECS DATABASE | XYZ.COM/BOSTON/MFG2/TOBI/193/ |
| 194 | TOBI DESIGN SPECS DATABASE | XYZ.COM/BOSTON/MFG2/TOBI/194/ |
| 195 | QUALITY CONTROL DATABASE | XYZ.COM/AFS/GLOAL/QUALITY/195/ |
| 199 | PRODUCTION/YIELD MEAS DATABS | XYZ.COM/BOSTON/MFG2/PRODUCTION/199/ |
| 220 | ENVIRONMENT/RECYCLING DB | XYZ.COM/AFS/GLOBAL/ENVIRON/220/ |
| 340 | X-RAY TOOL DATABASE | HUTTON.TOOL.COM/XRAY/340/ |
| 355 | HOT ION BATH PARAMETRIC DB | XYZ.COM/DANBURY/PARAMETRIC/ION/355/ |
| SPEC.TXT | -DRAFT- XRAY TOOL NEW SPEC | XYZ.COM/AS400-5/LOCAL/JIMMY/SPEC.TXT |
| 880 | ATTORNEY WORKING DATABASE | TANNER&TANNER.COM/CORPLAW/DRAFTDB/880/ |
| ISO9000 | ISO-9000 DOCUMENT | TANNER&TANNER.COM/ISO/9000.TXT |
| 901 | XYZ COMPANY INFO. DATABASE | XYZ.COM/AFS/GLOBAL/DB901 |
| 902 | XYZ EMPLOYEE INFO DATABASE | XYZ.COM/AFS/GLOBAL/DB902 |
| 903 | XYZ PHONE DIRECTORY | XYZ.COM/AFS/GLOBAL/DB903/PHONE/ |
| 904 | XYZ COMPANY POLICY DB | XYZ.COM/AFS/GLOBAL/DB904 |
| 988P | XYZ PATENT DATABASE | XYZ.COM/MVS/LAW.PATENT/988/ |

FIG. 15

ENHANCEMENT TO A SYSTEM FOR AUTOMATED GENERATION OF FILE ACCESS CONTROL SYSTEM COMMANDS

BACKGROUND OF THE INVENTION

1. Field of the Invention

The present invention generally relates to file access control systems for controlling access to a plurality of databases for a large number of users and, more particularly, to enhancements therefor to provide reduction in user burden in obtaining access to shared resources, containing password proliferation and reduction of administrator burden in implementing and updating access authorizations, particularly when databases are added or removed.

2. Description of the Prior Art

Modern computer systems are well-suited to the storage of vast amounts of data and numbers of program applications which may, for convenience of maintenance and interactive search and use, be organized into large numbers of databases. Networking of computers allows very large numbers of users which may be distributed over a wide geographic area to obtain or interact with such data or applications. In such systems, security in the form of control of access to data and program files is necessary to maintain file integrity and limit provision of confidential, sensitive or proprietary data to unauthorized persons as well as to avoid concurrent access to users with authorization to alter a file which could result in loss of data by overwriting a modified file with another differently modified file. It is also necessary to authenticate the identity of a person seeking access to files.

Accordingly, it is common practice to register users of a system together with a unique password to authenticate the identity of the user of the secure network or secure web server system in association with a list of system resources (e.g. files, applications, hardware such as printers and scanners and the like) to which the user, once authenticated, may be granted access. The access of the user to a particular resource must generally be implemented by an administrator.

Once an access authorization is implemented the resource must generally be separately accessed by the user using a password for the individual resource, thus engendering inconvenience for the user due to the separate operation to obtain access and, when many resources are available, maintaining a password for each resource. (Doing so often undermines resource security when a user must maintain a written record of current passwords.) It is also customary to associate a resolution mode which may be associated with various levels of security of data or applications in accessible files or databases and/or a mode of interaction therewith (e.g. read only or read/write for each accessible file or database for each authorized user.

These user authorizations for access to portions of a shared resource can, in theory, be unique to each user and while, in practice, many users may have identical groups or combinations of authorizations, unique authorizations must be accommodated. It can be readily appreciated that as shared resources become large, having hundreds or thousands of databases, each having many hundreds or thousands of files, and user populations become large, the burden on an administrator to implement and manage access authorizations, particularly when databases are removed, added or substituted becomes great. In general, a new user authorization for access to, for example, fifty databases within a larger group of databases within the system will require fifty separate authorizations to be implemented by the administrator, generally by editing of individual entries in a master list of authorizations. Conversely, when a database is added, removed or substituted within a shared resource having, for example, two thousand users, half of which are authorized to access the database, one thousand individual changes in the master authorization list will be required (if not twice that number when one database is substituted for another). Changes in passwords, which is often required periodically from the user or issued by a background routine for avoiding compromise of security may involve thousands or millions of individual editing operations on the master authorization list, if not automated in the system or individual applications.

This process of editing entries in an extensive master list is subject to error and time consuming, often denying access to authorized users for an extended period of time (or, conversely, permitting access for an extended period of time after a desired termination of access authorization) while the changes are implemented. Errors from failure to delete obsolete access authorizations tend to accumulate over time and compromise security of the system.

The extent to which such changes to the master list of authorizations can be automated has been limited, largely due to the need to accommodate unique authorizations, alluded to above, that may involve any combination of databases available through the secure web server. For example, in a system of modest size having fifty databases and two thousand users, the number of possible combinations of authorizations potentially forming unique accesses numbers over one million one hundred thousand.

One particularly successful system for reducing administrator and user burdens is disclosed in U.S. Pat. No. 5,627,967 to Dauerer et al, assigned to the assignee of the present invention and hereby fully incorporated by reference. In the system disclosed therein, desired changes may be indicated in a file generated by a simple word processor. A processed master list in text form is generated from the master list of existing accesses granted for the network.

Invalid and duplicate access authorizations (often referred to simply as "accesses") may then be detected and removed by rapidly executed word processor functions and the editing of the processed master list facilitated with other word processor functions. Administrator commands may then be automatically generated from the edited text to update the master list of the system. Administrator operations are further facilitated by grouping authorizations for accesses to a plurality of resources under an "alias" so that the administrator can use the alias as a single notation corresponding to a plurality of resources and the individual administrator commands for each resource then generated from the alias.

However, while this system facilitates administrator operations and removal of obsolete or duplicated access authorizations, neither it nor other known systems significantly reduce the overall complexity of administration of access authorizations as secure web systems become large in terms of number of resources, number of users or both. Further, the number of resources to which access authorizations pertain may be greatly increased by division of such resources in order to provide different levels of security for different portions thereof. Additionally, there has been much recent development in the technology of database architecture and management techniques as well as a trend toward archival documentation of database content; both tending to increase the number of substitutions of databases and correspondingly increased numbers of access authorization changes on large systems.

SUMMARY OF THE INVENTION

It is therefore an object of the present invention to provide an access control system which exploits the usual existence of classes of users that may be granted similar groups of accesses while accommodating a need for unique user authorizations.

It is another object of the invention to provide a system in which the number and complexity of administrator operations is minimized particularly for addition, removal or substitution of databases among shared resources.

It is a further object of the present invention to provide an enhancement for the access control system described in U.S. Pat. No. 5,627,967, incorporated by reference above, to increase operational efficiency thereof as well as its capabilities while increasing both administrator and user convenience.

It is a further object of the invention to provide improved and expedited communication with a system administrator.

It is yet another object of the invention to provide a system which provides containment of the number of password enrolled on a system and to contain proliferation of passwords as the number of resources and/or users of a system increases.

In order to accomplish these and other objects of the invention, the invention builds upon the matrix of users of U.S. Pat. No. 5,627,967, by inclusion of an additional function of giving each user one or more security profiles that address the kinds of accesses that groups of users may require. A user may correspond to several groups (e.g. manager, engineer, and the like) and may be accorded a plurality of profiles. By the same token, the number of users in a group need not exceed a single user and a unique profile or combination of profiles may be provided in accordance with unique access requirements for any particular user. An unlimited number of profiles may be generated to service any number of users with common or unique access requirements and which may be modified at will by the administrator in a reduced number of operations which may be facilitated in the manner disclosed in the above-incorporated patent.

In order to accomplish the above and other objects of the invention, the method and system of the invention provide profiles, one or more of which can be associated with each user to specify one or more resources to which access may be granted to a user to whom that profile is assigned. Lists of users, profiles and resources are maintained in an access control program executable on a network server, and may be freely created and edited under supervision of a system administrator and the profiles provide an association between the users and resources that the users are authorized to access and the mode of that access. Thus changes in accessible resources may be automatically propagated through the access authorization information and associated with users while accommodating unique user authorizations. Further, access authorizations are automatically carried out upon completion of any editing of the lists of access authorization information. Users are authenticated at the server level and authorized requests of authenticated users are directed to the target resource.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
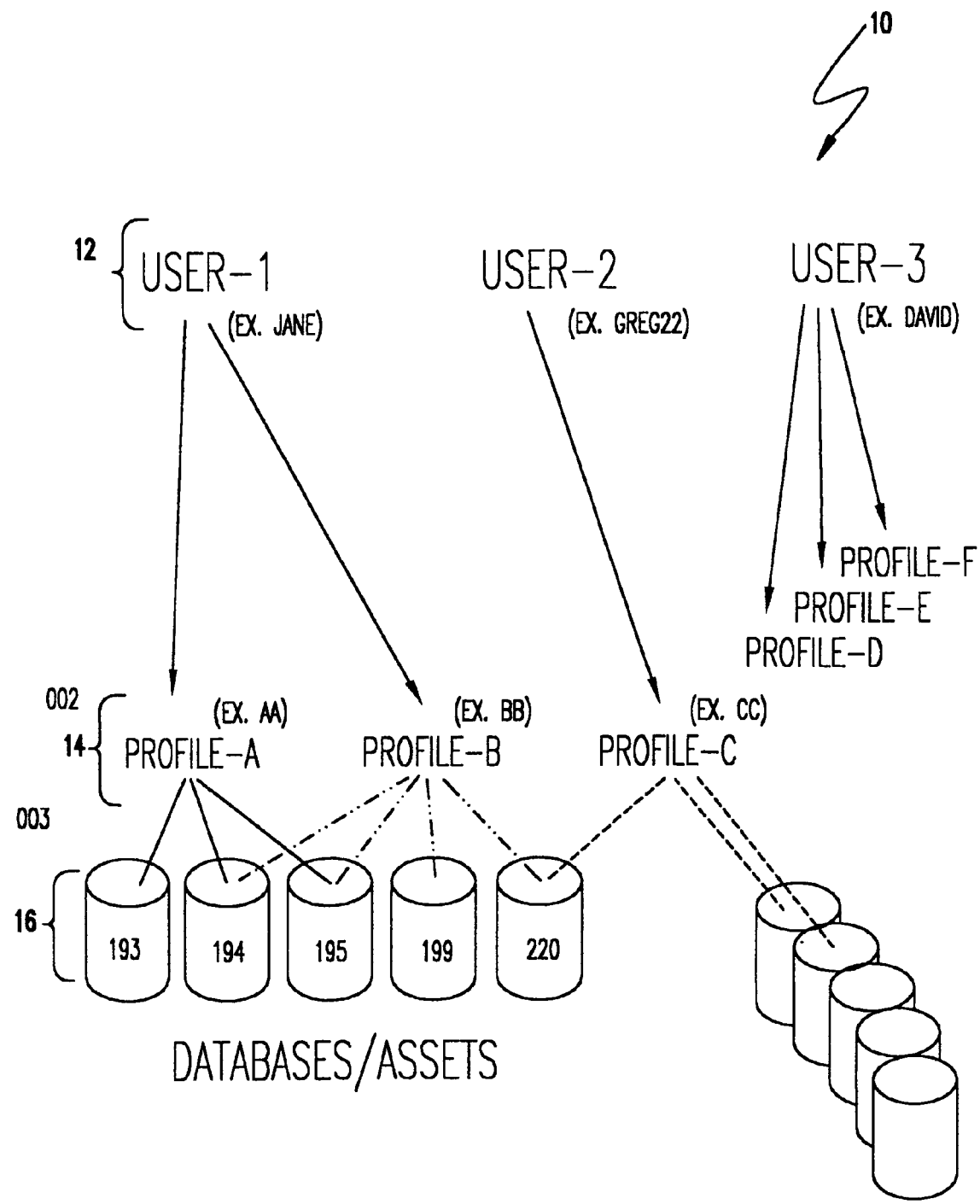
FIG. 1A is a high level schematic depiction of the operational architecture of the present invention.

Referring now to the drawings, and more particularly to FIG. 1A, there is shown a high level schematic depiction of the architecture of the present invention. The level of abstraction of the system as depicted in FIG. 1A is intended to facilitate understanding of the basic concept of the invention and not concepts or particulars of any particular implementation. For example, the techniques described in the above-incorporated U.S. Pat. No. 5,627,967 are primarily implemented in a "front end" that facilitates maintenance of master file integrity. Such architecture may also be applied to lists of users, profiles and databases and utilization thereof in accordance with the invention as will be described hereinafter in much the same manner as it is disclosed as applying to the user access master list therein which are details well below the level of abstraction represented in FIG. 1A.

It was noted above that the system of U.S. Pat. No. 5,627,967 is principally directed to facilitating administrator interaction with the secure system including detection of duplicate or invalid user accesses but does not significantly address increases in system access complexity as secure web systems become very large or optimally reduce user inconvenience in authentication to individual resources, particularly when databases are added, removed or substituted or when the number of access authorizations for each user may become large.

Even though the provision of aliases as a perfecting feature therein allows groups of administrator commands to be automatically generated based on a conveniently small text string, such commands must be individually modified after the administrator commands are initially generated and do not provide any enhancement of user convenience in regard to accessing of resources. That is, use of aliases does not allow automatic propagation of changes in access authorizations over a plurality of users or a plurality of resources since a directory can only be listed in one alias to provide correct operation when a directory was to be deleted and does not propagate user identifications. Therefore the principal utility of that system was for performing checks for and removal of obsolete and duplicated information during initial loads. Furthermore, no known arrangement provides for minimization of administrator burden in large systems by accommodating the number of users which may fall into a class to which a common set of accesses may be granted while also allowing a unique set of accesses to be granted to other users or combinations thereof.

The present invention utilizes the concept of access profiles (hereinafter "profiles") to optimally reduce the number of administrator transactions through automation of administrator commands on large systems with extensive numbers of databases or other shared resources (hereinafter "DB/assets" or "directories") and very large populations of users, many of which can be grouped in accordance with likely access needs and assigned one or more profiles. By the same token, profiles can be designed or "built" at will to accommodate any unique access needs of any particular user. The concept of profiles also allows user accesses to designated assets to be processed as a group to increase user convenience since user identity authentication can be handled at the profile level.

In accordance with the basic principles of the invention, the number of DB/assets that can be accommodated in a single profile, the number of profiles assigned to any given user and the number of users to which a profile may be assigned are completely arbitrary and may be as few as one DB/asset, profile or user, respectively. At the same time, the use of a single type of data structure or object for users, profiles and DB/assets (exemplary lists of which are illustrated in FIGS. 13–15) allows the facilities of U.S. Pat. No. 5,627,967 or any other desired access authorization control enhancement to be applied to any such list in a consistent manner in order to automate the issuance of administrator commands.

Referring again to FIG. 1A, it should be appreciated that the architecture of the system 10 in accordance with the invention is divided into three levels. At the level indicated by reference numeral 12, users are assigned one or more security profile(s), indicated by pointers/arrows to the level indicated by reference numeral 14. It is through the profile(s) that a user gains entry into one or more databases (or assets), resources or directories 193, 194, 195, 199, 220 at the level indicated by reference numeral 16 to which the secure web server allows access. An exemplary user table including corresponding profiles and other information by which the user is authenticated is illustrated in FIG. 13.

Specifically, each profile consists of a listing of DB/assets (e.g. AA, BB, each of which may be a database, application program, hardware, etc.), each of which is associated with a specific access mode (generally either Read Only or Update (or Read/Write)). Update mode allows user to create, modify and delete files in that data base. Update authority is maximum authority, Read Only authority is minimum authority. A particular profile is characterized by the type of data bases (or assets) it contains and by the access authority given to each data base (or asset) listed therein. Thus, a profile may also correspond to a role into which a particular user may be grouped.

Accordingly, as illustrated in the exemplary profile table of FIG. 14, a profile may be named Manager with access to Company Policy, Employee data base, a Production Report data base, Contract data base, and the like. On the other hand, a profile named Engineer may contain Product Specification data base, Process Recipe data base, Quality Control database, as well as a Production Report data base.

Data bases (or Assets) are the ultimate resources to which a Web Server may link a user. The Web Server stores the path by which the user is allowed to access a DB/asset. Thus, when a user is properly authenticated, a link to the data base (or asset) with the appropriate access authority is established. In accordance with the invention, the databases (or assets) are thus grouped into profile(s) which are assigned to users. An exemplary table of DB/assets is illustrated in FIG. 15.

More specifically and as an overview of the operation of the invention, the invention uses the matrix of employees from U.S. Pat. No. 5,627,967 and adds the additional function of giving each employee one or more security profile(s) that addresses the kinds of accesses that different groups of users require for respective DB/assets. The invention will also allow for the condition of providing a profile for the employee that has unique access requirements. The invention further allows a user to have more than one profile, for example, "manager" and "engineer", as alluded to above. A "resolve" feature resolves conflicting access specifications among the profiles, if conflict occurs, such as access mode being minimum or read only in one profile and maximum or read/write in another profile assigned to the same user.

By using the concept of profiles, the system allows each user to be authenticated just once when the administrator assigns a profile and databases (or assets) can simply be added to, removed from or substituted in the profile when changes are made. When data bases (or assets) are added to a profile, all of the users which use the profile are automatically granted access to the new databases. When data bases (or assets) are removed from a profile, all the users which use the profile have their access to the data bases (or assets) automatically revoked. In the case where a new data base replaced a previous one in a profile, the action is one of automatic revocation from one data base (or asset) and automatic granting of access to the new data base (or asset) for all users which use that profile or any other profile in which access authorizations for that asset are included.

If one of the data bases is also listed in another profile that the same user uses, then any conflict presented by the specific access mode (Read only, or, Update) for respective data bases is resolved by a user pre-assigned resolution mode. The resolution mode can either be resolve-to-minimum, which takes the minimum authority from the set, or resolve-to-maximum, which takes the maximum access authority. The system default for access conflict resolution is preferably set to default-to-minimum. The default is a parameter that the system administrator can reset to default-to-maximum.

When a user is added to the matrix, the user is prompted for two key pieces of information: (1) the Profile(s) to use, and (2) Users Resolution mode (min or max). The user is also prompted for other information related to administration, such as name, department, e-mail address, and so forth. With the association of one or more profiles to the user, the system automatically grants access to all the data bases (or assets) listed in each profile. Access mode for each data base is listed next to the data base (or asset) name in the profile. Any access conflict is resolved via the users resolution mode (min or max).

When a user is removed from the system, the system will automatically revoke all access to all the data bases (or assets) listed in all the profiles that are assigned to the user. When a user replaces one profile with a new profile, the automatic action is that of revoking access to all data bases in the previous profile, and granting access to all the data bases listed in the new profile. Any conflicts in access authority are resolved via the users resolution mode. If none are specified, then the default is used.

The system keeps the (1) name, (2) description, and (3) access path for each data base (or asset) in a common table. When a user requests access to a data base (or asset), the system checks whether or not the user has been granted access, as determined by previous Profile processing. If access has not been granted, the user sees a return message informing him/her that authority has not been granted. If access has been granted, then the user is prompted for password authentication. If the user provides the correct password, the system follows the path indicated in the database/asset table and links the user to the specific data base (or asset), thereby permitting authenticated entry into the data base (or asset).

It can be appreciated that all of these functions are of substantial convenience to users as well as providing very substantial automation of implementation of administrator commands and reduction in number of administrator transactions. The derivation of these functions in accordance with a preferred embodiment of the invention will now be discussed in detail in connection with FIG. 1B and FIGS. 2–15. While it is believed that terminology used hereinafter is fully in accordance with usage in the art, the following definitions are provided for reference and clarity:

ACCESS MODE A data base in a specific profile is registered with an access mode specifying the type of access allowed when a user links to the data base (or asset). Typical access mode are: Read Only, Update. Update encompasses Write, Create, Delete, Modify, Execute. In the preferred embodiment of the invention, only two access mode are allowed in the interest of economy: Read Only or minimum and Update or maximum.

ASSET Any Web Server attached resources other than data bases (or file directories). For instance, a single file, or an attached hardware equipment such as camera, scanner, fax, copier, manufacturing tool, or another computer.

DATABASE Repository of information to which the Web Server links a userID which can be a computer directory or file system. A database typically consists of many files related to the same subject. Example, a Company policy databases consists of many files, each dealing with a specific company policy.

DB/ASSET TABLE A table whose entries consist of data base or asset, and definition and path of each, which the Web Server uses. See FIG. 15.

PATH The network route which the Web Server uses to connect a web requestor (or user) to the data base (or asset) resource. When the Web Server links a user to a data base, the network route is the path. Path is found by look-up from the DB/Asset Table. (See FIG. 15).

PROFILE Security profile. A userID is assigned one or more security profile. In accordance with a preferred embodiment of the invention, a security profile comprises a list of databases or assets and their access mode with which this specific profile is defined.

PROFILE TABLE A table whose entries consist of profiles, and definition of each profile, which the Web Server uses. See FIG. 14.

RESOLUTION MODE A parameter specified with each userID determining how conflicting access mode is to be resolved. The two resolution modes used in the preferred form of the invention are:
(1) Resolve-to-minimum (or min), and
(2) Resolve-to-maximum (or max). Read Only is considered minimum and Update is considered maximum. Referring to FIG. 1A, if a userID is associated with two profiles, for example: AA and BB, AA contains a 193 data base with an access mode of Read Only (R), while BB contains the same 193 data base with an access mode of Update (U), when granting access, the Web Server is presented with a conflicting access mode. Looking up on the userID in the user table which points to a profile, if the resolution mode is max, then, 193 is granted to the userID as a U or update access. If the userID does not specify a resolution mode, then the system default resolution is used. In this case, it may be min, as set by the system administrator for all profiles and for all data bases (or assets) in this Secure Web Server system.

SECURE WEB SERVER A server which serve Web pages to requesters, but a requestor is authenticated with password before presented with a resulting web page.

USER TABLE A table whose entries consist of userIDs, and definition of each userID, which the Web Server uses. See FIG. 13.

Figure 1B:
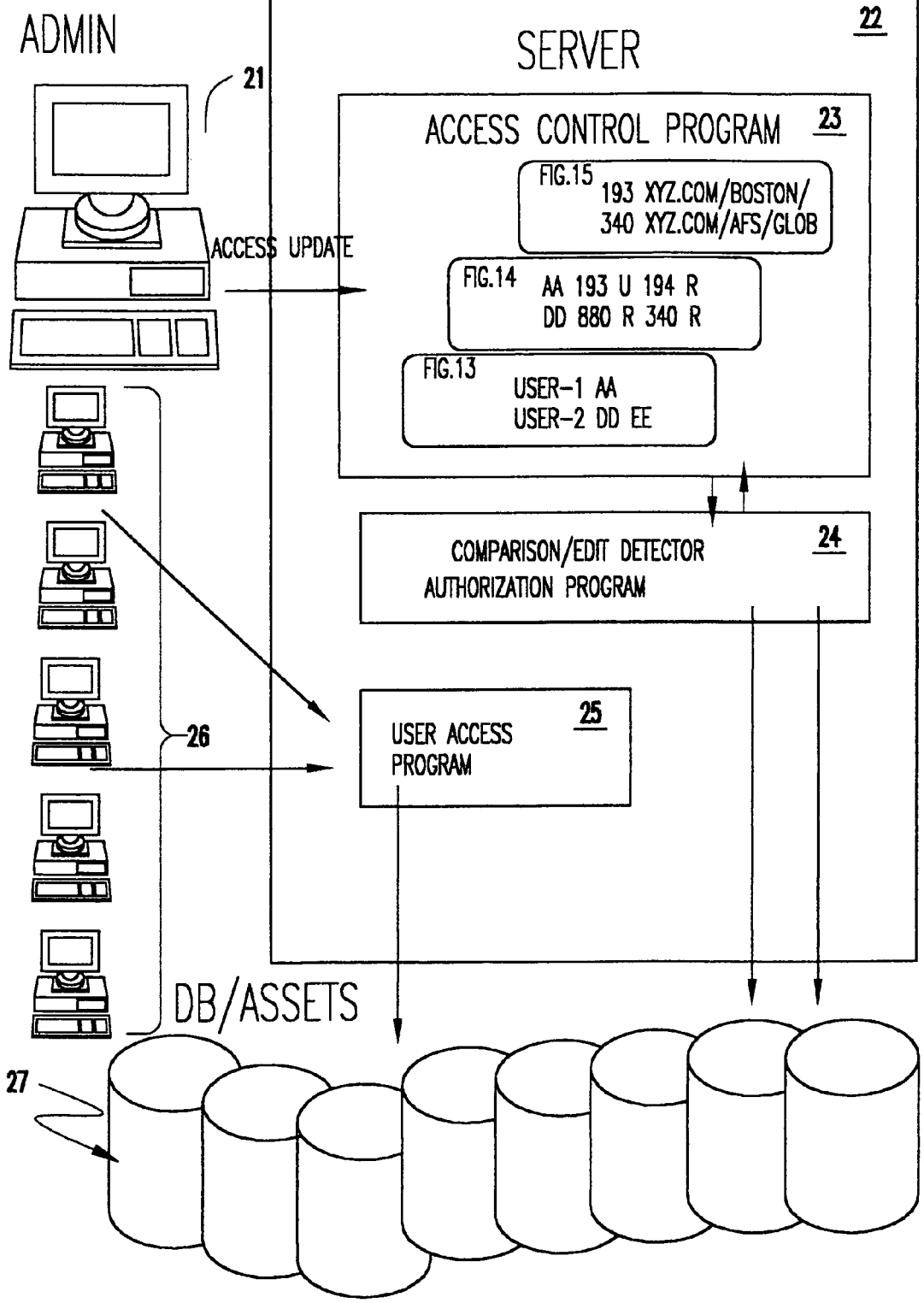
FIG. 1B is a high-level block diagram of a preferred hardware architecture of the present invention, particularly as implemented as an enhancement to the system of U.S. Pat. No. 5,627,967.

Referring now to FIG. 1B, a high level schematic diagram of a preferred implementation of the invention is shown. It will be appreciated in light of the following discussion that the perfecting feature of providing aliases as described in the above-incorporated system is fully provided by the present invention in addition to the comprehensive array of meritorious functions additional thereto. By the same token, the automation of production of administrator commands is provided in U.S. Pat. No. 5,627,967 principally achieved through the interaction of administrator terminal 24 storing master list 26 with front end 20 and processed master list 36, as disclosed therein, and it should be understood that the invention is fully applicable to systems which do not include these features or provide the facility of automated generation of administrator commands.

FIG. 1B is a block diagram schematically illustrating an exemplary hardware environment including the invention. Basically, the server 22, under supervision of administrator 21 provides selective access of an arbitrarily large number of users 26 to an arbitrarily large number of databases or assets 27 through an access control program 23 containing user, profile and DB/asset lists or tables such as are shown in FIGS. 13–15.

The access control program 23 executes in a server 22 managing entries into the three tables. When the access control program completes execution, and authorization program 24 is invoked. The access control program 23 thus functions as a front-end for the authorization program 24.

The authorization program 24 reads the user table to determine if there is any new user, profile or DB/asset. The authorization program executes upon comparison of the current state of the tables and operates only on the detection of a difference between the current and immediately previous table states. For example, for each new user found, the authorization program 24 reads the profile table entry assigned to that user. The authorization program then reads the profile entries in the profile table specified for the user in the user table to determine the DB/assets for which access has been granted to that user and the access mode assigned to each profile for that user. The authorization control program then determines the path (e.g. the URL of the DB/asset or directory in a web environment) to each asset from the DB/asset table and performs the grant authorization for that user for each DB/asset 27 for which access has been granted for that user. In the case of user, profile or DB/asset deletion, the authorization program 24 is invoked to perform the reverse operation to remove the table entry.

Thus, at the time of access to a DB/asset 27, a user 26, after accessing the server (e.g. through a universal resource locator (URL) corresponding to the server 22 and being authenticated to the server, invokes the user access program 25 through a web or network communication link to server 22 to gain access to a particular DB/asset. Users may request access by selection (e.g. by a mouse click) of a menu or sub-menu item (generally highlighted in text in a web page which includes an embedded URL address indicating a link). The form of a menu is not important to the practice of the invention and, in a web page context highlighting may, for example, be omitted where access is not authorized or the display of unauthorized assets may be suppressed entirely. Alternatively, if access is not authorized for a selected DB/asset, a message to that effect can be returned. The URL then serves as the path to the DB/asset. Since access has already been pre-authorized, as described above, the user will be able to access the DB/asset directly without any further action such as entry of a password corresponding to that particular DB/asset.

Thus, in summary of this overview of the invention, the administrator 21 supervises updating and maintenance of the three tables in access control program 23 and the authorization control program 24 performs the actual grant or revoke operations to DB/assets 27 in accordance with data developed by execution of the access control program 23. The user 26 then communicates directly with the server 21 and when the user has been properly authenticated to the server 22, the access control program 25 guides the user via the paths earlier established by execution of authorization program 24 to the earlier pre-authorized target DB/asset.

It should be appreciated that there are two independent sets of operations performed in regard to the DB/asset: one performed under supervision of the administrator and from which users are excluded that not only simplifies administrator operations and propagates changes over large populations of DB/assets and users but performs the user access grants and revocations; and the user access program which authenticates the user upon original access to server 22 and thereafter directs user requests to the target DB/asset, if access is authorized, directly and without any need for the user to obtain an access grant from the DB/asset. That is, once the user is authenticated to the server, the system in accordance with the invention operates in the manner of an unsecured system to the extent of the user's authorization as specified by assigned profiles. Except for the display of assets to which access may not be authorized (and which can be suppressed, as alluded to above) the security provided by the invention is entirely transparent to an authenticated user.

Figure 2:
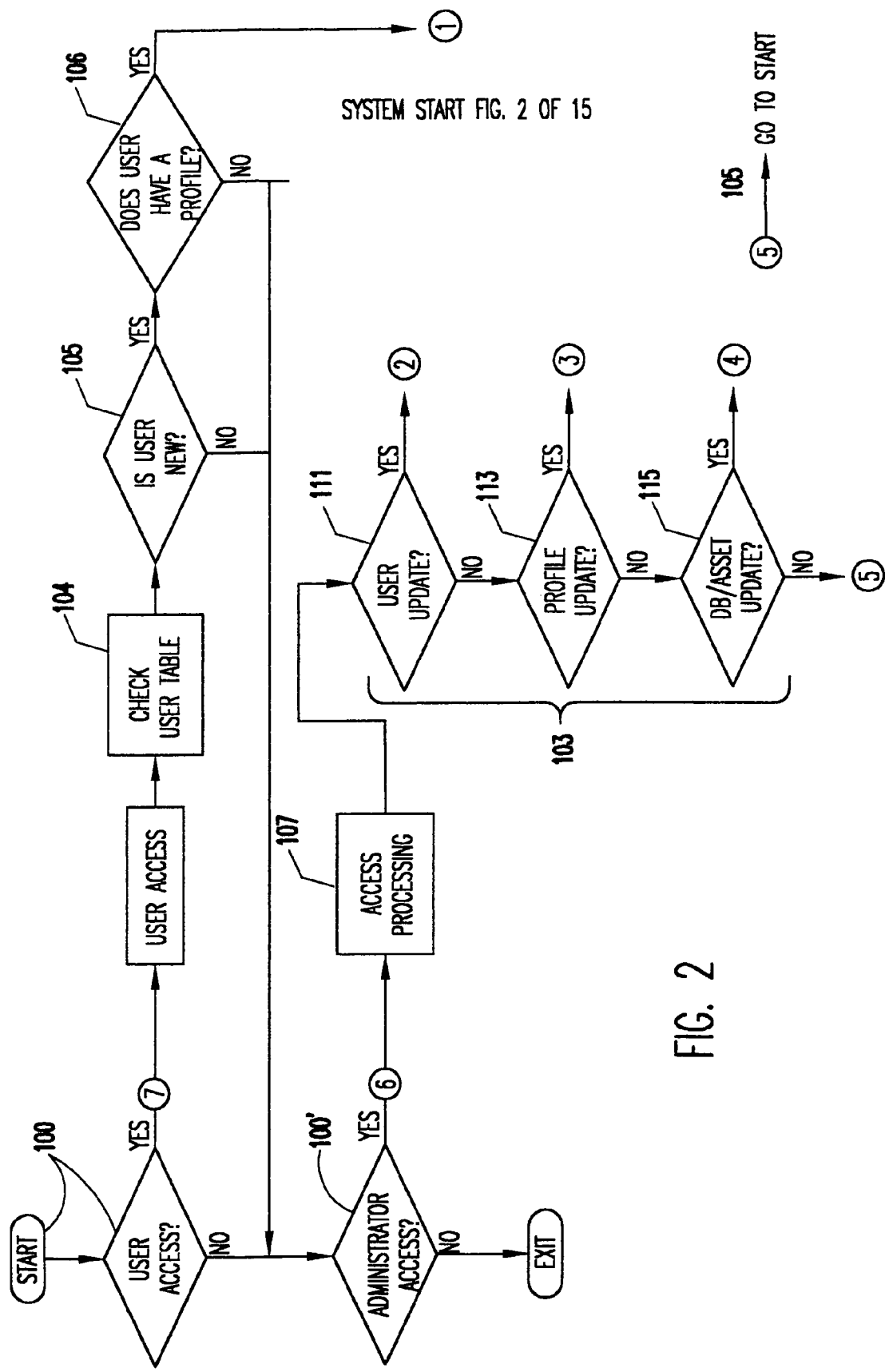
FIG. 2 is a flow chart depicting a system start routine in accordance with the present invention.

Referring now to FIG. 2, the system start routine in accordance with a preferred form of the invention will be discussed in detail. This phase of the process in accordance with the invention starts at 100 whereupon it is first determined which of two modes of accessing the system is to be used; either as user requesting access to the Web Server resources, which are data bases or assets or as an administrator who manages the User Table, Profile Table, and DB/Asset Table, exemplary forms of which are illustrated in FIGS. 13–15.

As illustrated in FIG. 2, accesses as an administrator and as a user are preferably but not necessarily mutually exclusive. That is, it is considered preferable as a matter of simplicity of implementation to test for a requested access as a user and then branch to a test for a requested access as an administrator. A requested access as an administrator and a user not previously enrolled can thus be easily caused to branch to the same operation (administrator access 100') in order to process enrollment or modifications of access authorizations. The administrator is authenticated with a password and recognized by the system as one who could execute "Access Processing" codes. If access is attempted as other than a user or an administrator, access is denied and the process terminates.

Assuming the requested access is as a user rather than an administrator, the process branches to operation 104 wherein a user request for access is checked against the User Table to see if the userID is in the table, or, if the person seeking access is in fact a new user. Based on the information returned from the user table, if the user is a new user, then the user is routed to the administrator for new user processing. If the user is already enrolled, then the system looks for a profile or profiles in the User Table under the particular userID entry as indicated at 106. This information can be returned in the same storage access that returns information that the user is enrolled. That is, a user is a new user if the system can not find the userID in the User Table but if the userID is found, the profile for that user, if it exists, can be returned, as well.

Figure 3:
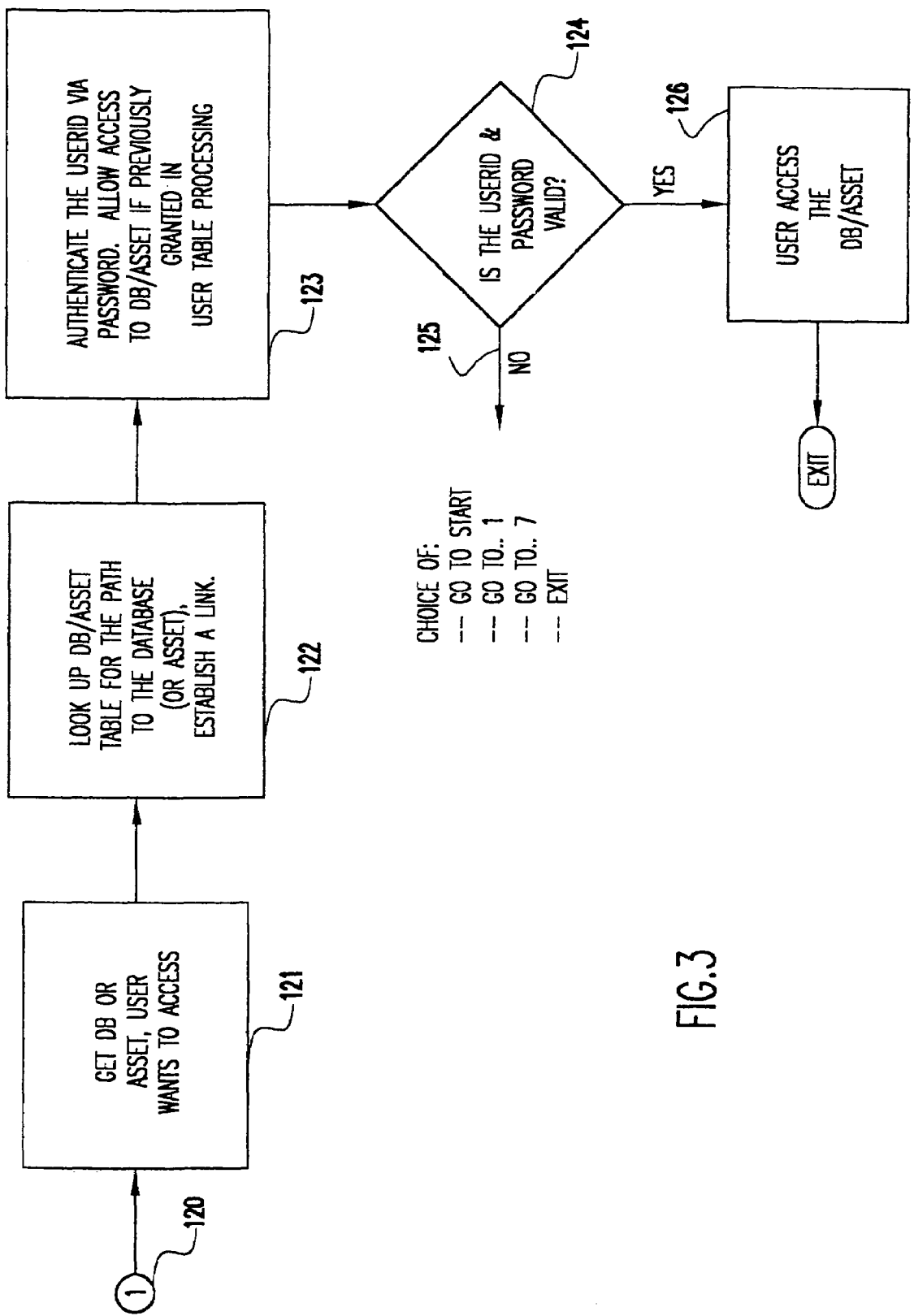
FIG. 3 is a flow chart depicting a system user access routine in accordance with the present invention.

If a profile exists for the enrolled userID, then the userID is allowed entry and access processing continues as illustrated in FIG. 3. If profile does not exist, as determined at 105 then the user is routed to the administrator for profile processing. (It should be noted that DB/assets may exist that are not specified in any profile and profiles may exist that are not assigned to any user. While this information is not usable by users, the volume of such data is generally very small and does not adversely affect system operations while being available for use by the system administrator in granting or altering user authorizations. However, it is desirable that the administrator be notified of any user or userID which exists for which no access authorizations exist and this function is accomplished by this branching operation.) This facility of the present invention is of substantial convenience upon implementation of the system of the invention in conjunction with an existing access control system; routing authorized users to the administrator to establish a profile for individual users as access is requested.

Either the absence of a stored userID or a profile corresponding to an existing userID causes branching of the process to step 100' to invoke administrator supervision of any and all changes in access authorizations as invoked at 107 and which can be carried out is several ways depending on the information stored in the user table, profile table and/or DB/asset tables of FIGS. 13–15 and the enrollments or changes thereto which are desired. Need for particular processes in regard to each of these tables is serially detected at 111, 113 and 115 and appropriate processes, illustrated in FIGS. 3–12 carried out, as will be discussed below. If none of these processes is to be invoked, the process loops to start 100.

More specifically, the Secure Web Server administrator in accordance with the invention manages Web Server usage/access through three tables, these are: User, Profile, and DB/Asset. Entry into each tables is program controlled via update processes, to be further described following flow chart paths 2, 3, and 4. The tests indicated at 111, 113 and 115, collectively indicated by 108, are preferably implemented as prompts to the administrator who has previously been authenticated. Therefore the branch from 105 or 106 to step 100' does not provide for user access to the access control arrangement and requires any changes in the user, profile and DB/asset tables to be monitored and conducted under the supervision and authority of the administrator. Thus, if the administrator answered "NO" to each of the update prompts (User, Profile, DB/Asset), the system loops to START 100.

Referring now to FIG. 3, the user having been recognized as a valid user with a userID in the User Table, and with at least one security profile, the user input (e.g. via a click on a web page) indicates a selection of a data base (or asset) to be accessed, as indicated at 121. As shown at 122, a link is established for the user to the data base or asset he/she requested. The path to the specific data base is read in from the "path" information in the DB/Asset table, shown in an exemplary form in FIG. 15. If the userID is one that has been granted access via previous User Table processing, discussed above, as shown at 123, then the user is prompted for a password if access has not been granted previously for the asset. If the userID has not been granted access, then a return message informs the user that the user does not have the authority to access the requested resource (e.g. web page) indicated by the link.

A denial of access to a link even though access to the system may have been granted is achieved by the resource/asset indicated by the link not being included in the profile associated with the user. On the other hand, even if access is granted to the asset, additional passwords or security procedures may be provided at the resource/asset level for increased security. For example, the system of the invention could be used to invoke the additional security procedure for the asset rather than directly pre-authorizing user access to the asset itself.

The password, if required at this point, is checked, and if valid, the user is allowed access to the data base (or asset), as shown at 124. If either userID and/or password is not valid, then the user is informed of the fact, and, returned to START (125), data base selection (1), userID entry (7), or Exit. The choice between these alternatives is not important to the practice of the invention in accordance with its basic principles but generally would be chosen as an incident of the security level to be provided and different options could be provided in accordance with the protection to be accorded to particular assets.

For example, an attempt to access a critical asset by a user not authorized to do so could easily be arranged to deny access to all other assets until the user had again been authenticated. If such a general procedure is not desired, upon entry rejection (or access denial), the user may be given the choice of going to START, renewed data base selection (1), renewed userID entry (7), or Exit. If the requested access is authorized and the user properly authenticated, entry is accepted and access to the data base (or asset) is permitted, as indicated at 126.

Figure 4:
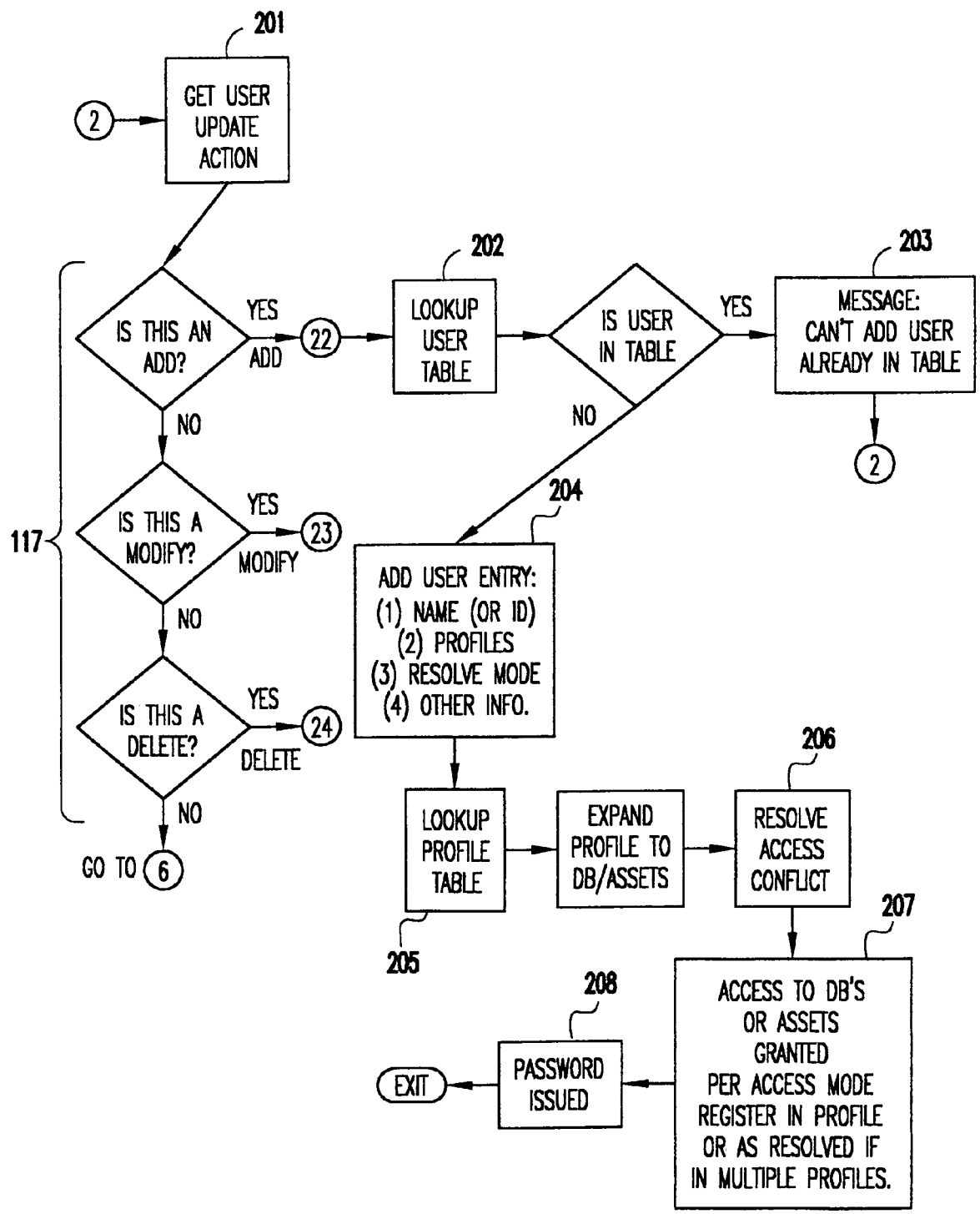
FIG. 4 is a flow chart depicting a system user update:ADD routine in accordance with the present invention.
Figure 5:
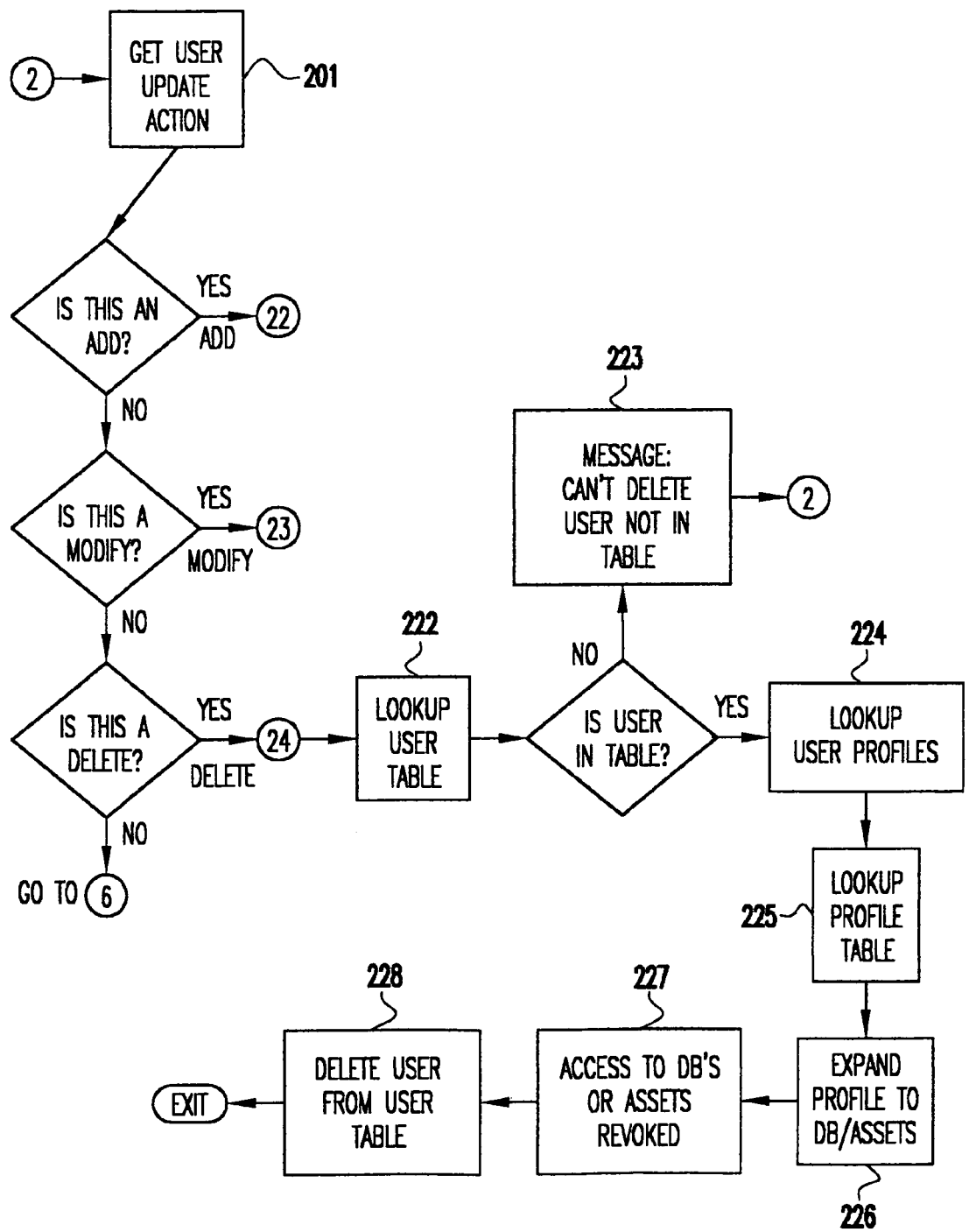
FIG. 5 is a flow chart depicting a system user update: DELETE routine in accordance with the present invention.
Figure 6:
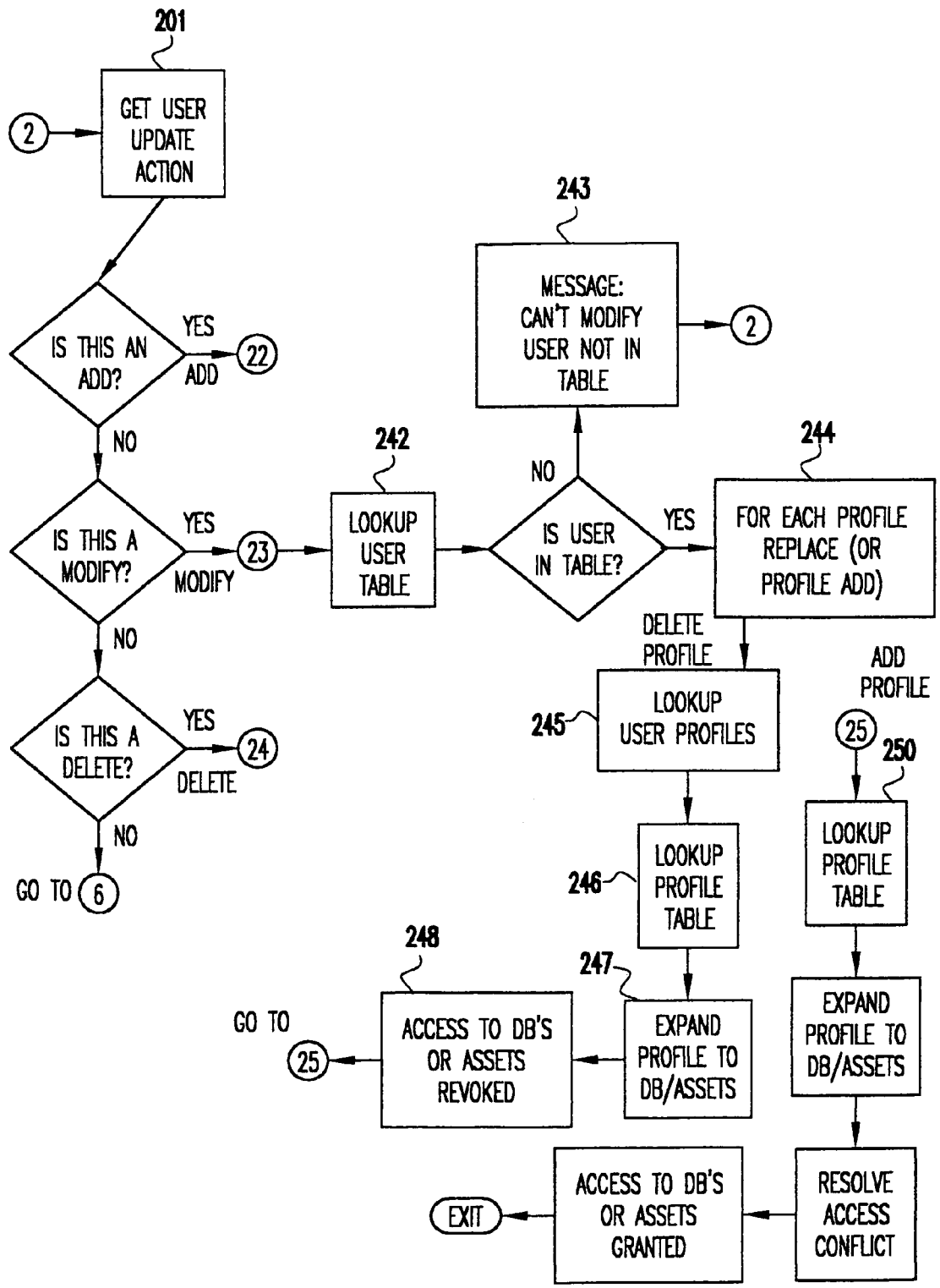
FIG. 6 is a flow chart depicting a system user update: MODIFY routine in accordance with the present invention.

FIGS. 4–6 illustrate three user update processes any of which can be entered upon administrator authorization from 111 of FIG. 2. Preferably a menu and branching steps similar to tests 105 employed, as illustrated at 117 of FIG. 4, to interrogate the administrator (as shown at 201 in FIGS. 4–6) whether and ADD process, a DELETE process or a MODIFY process is to be performed on the user list (e.g. FIG. 13). Similar arrangements providing administrator intervention are preferably employed in the choices between the processes of FIGS. 7–9, entered from test 113, and the processes of FIGS. 10–12, entered from test 115 as shown at 118 of FIGS. 7 and 119 of FIG. 10, respectively. In any of these cases, a test for a MODIFY operation is preferably performed before a test for a DELETE operation in order to minimize the number of operations required to effect a desired change by maintaining as much data as possible. Steps 201 and 117 are replicated for clarity in FIGS. 4–6, as are 301 and 118 in FIGS. 7–9 and 401 and 119 in FIGS. 10–12.) Assuming a user is to be added, the first task is a look-up operation in the User Table to see if the userID is already there, as illustrated at 302. If the userID is there already, then the system returns the message (303) that the userID cannot be added because it is already in the table and loops back to 201 to allow specification of another userID for the user. Thus the preferred form of the system assures that each user will have a unique userID.

If the userID is acceptable/available, the administrator enters the following information into the User Table, or can be prompted for it:

(1) UserID
(2) Profile names (can be more than one)
(3) User's Resolution (min or max)
(4) User's employee serial number (or social security number)
(5) User's name
(6) User's department
(7) User's e-mail address
(8) User's manager's e-mail address
(9) Other information such as phone, job title, etc.

as shown at 204 of FIG. 4.

Then, as shown at 205, for each profile (e.g. Manager, Engineer) entered, look up the Profile Table and expand the profile into it's component data bases (or assets). Example, the "Engineer" profile becomes data bases: 194, 195, 199, and 220. (See also BB in FIG. 14). If the user enters more than one profile (See also FIG. 13, e.g. Jane with AA and BB profiles), and the profiles contain common data bases (See also FIG. 14, AA and BB, both containing 194 & 195), and the access mode for the same data base (ex. 194, 195) disagree in the two profiles, the system looks up the user's resolution entry which will indicate either "resolve-to-minimum" or "resolve-to-maximum". The system then resolves the access mode based on the user's resolution specification. If user has no resolution specification, then the system default is used. System resolution is "default-to-minimum". The default is a parameter that the system administrator can set for the system as a whole.

Once the resolution has been accomplished in one of these manners, there will be a single combined list of data bases (or assets) from the various profiles, with access mode conflict resolved, the Secure Web Server system can then proceed to GRANT access to each data base (or asset) according to access mode specified in the Profile or as resolved between the profiles as illustrated at 207. It should be noted that access is granted at this time (upon authorization being granted rather than when access is later requested after registration of the authorization). When the authorized user actually points and clicks or take other selection action to link to a data base (or asset), userID and password authentication take place automatically at that time. Finally, the Secure Web Server system then issues a unique password to the user. This password can be changed by the user using another process. With this done, the system exits the completed ADD user process.

If a user authorization is to be deleted but not modified (for which a test should preferably be made earlier, as alluded to above, in order to minimize the number of administrator transactions), the process of FIG. 5 is entered, the first task is to access the User Table to determine if the userID is there. If the userID is not there, then return with the message (223) that the userID cannot be deleted because it is not in the table. If the userID is in the table, then the userID deletion process may continue with step 224 in which the profiles listed under (or assigned to) the userID are accessed. Next each profile corresponding to the userID in the Profile Table is accessed and each profile is expanded to its component data base or asset lists as shown at 226. With the resulting list of data bases and/or assets, the process may automatically iterate through each data base (or asset) and revoke the user's access authority in each data base (or asset) in each profile.

Thus each DB/asset authorization corresponding to a deleted userID is automatically revoked. That is, when a userID is taken out of the User Table, revocation is automatically made to take place at other points including each data base or asset corresponding to each profile associated with the deleted userID and can be performed rapidly in the interest of system security. Lesser deletions, such as when user's profile is changed, or, when a profile itself is changed are preferably carried out as a MODIFY operation which will now be discussed in connection with FIG. 6. When the access revocation is completed, then the userID entry is removed from the User Table as indicated at 228. With this done, the system exits, completing the DELETE user process.

In modifying a userID, the first task 242 is again to access the User Table to determine if the userID is there. If the userID is not there, then return with the message (243) that the userID cannot be modified because it is not in the table. If the userID is in the table, then proceed with the userID modify process at step 244. All changes such as Resolve, Serial#, Name, Dept, e-mail address, etc. are straight forward modification (editing replacement), except when the change is one of adding a profile, deleting a profile, or replacing a profile. (See also FIG. 13). If profiles are involved, then for each profile to be deleted or replaced, follow the DELETE-profile path (steps 245, 246, 247 and 248) to expand and automatically generate administrator commands for each DB/asset included in the profile. For each profile to be added or added-in-replacement, the ADD-profile path (250) is followed to expand the profile and automatically generate the administrator commands and a password for each DB/asset included in the added profile.

It should be noted that all of these operations are performed on the basis of entire profiles and it can be readily appreciated that substantial reductions in numbers of administrator actions and response time are realized as numbers of assets in particular profiles increase, regardless of whether additions, deletions or modifications are made. Also, substantial administrator convenience is achieved when a particular group of assets may be grouped as a profile that can then be authorized for particular classes of users of a large system. Further, user convenience is enhanced while administrator actions are substantially prioritized by provision for administrator communication when a user requests an access that has not been processed.

Similar procedures to ADD to, DELETE from and/or MODIFY DB/assets in a profile are illustrated in FIGS. 7–10 and will provide similar conveniences when databases or entire profiles are to be changed or substituted while user authorizations remain in place. As before, the administrator is interrogated for the process to invoke and supervision and intervention are thus assured, as is preferred. However, it should be understood that manipulations of profiles and DB/assets are, in general, initiated by the administrator without dialog with the user, as described above for the alteration of user authorizations.

Figure 7:
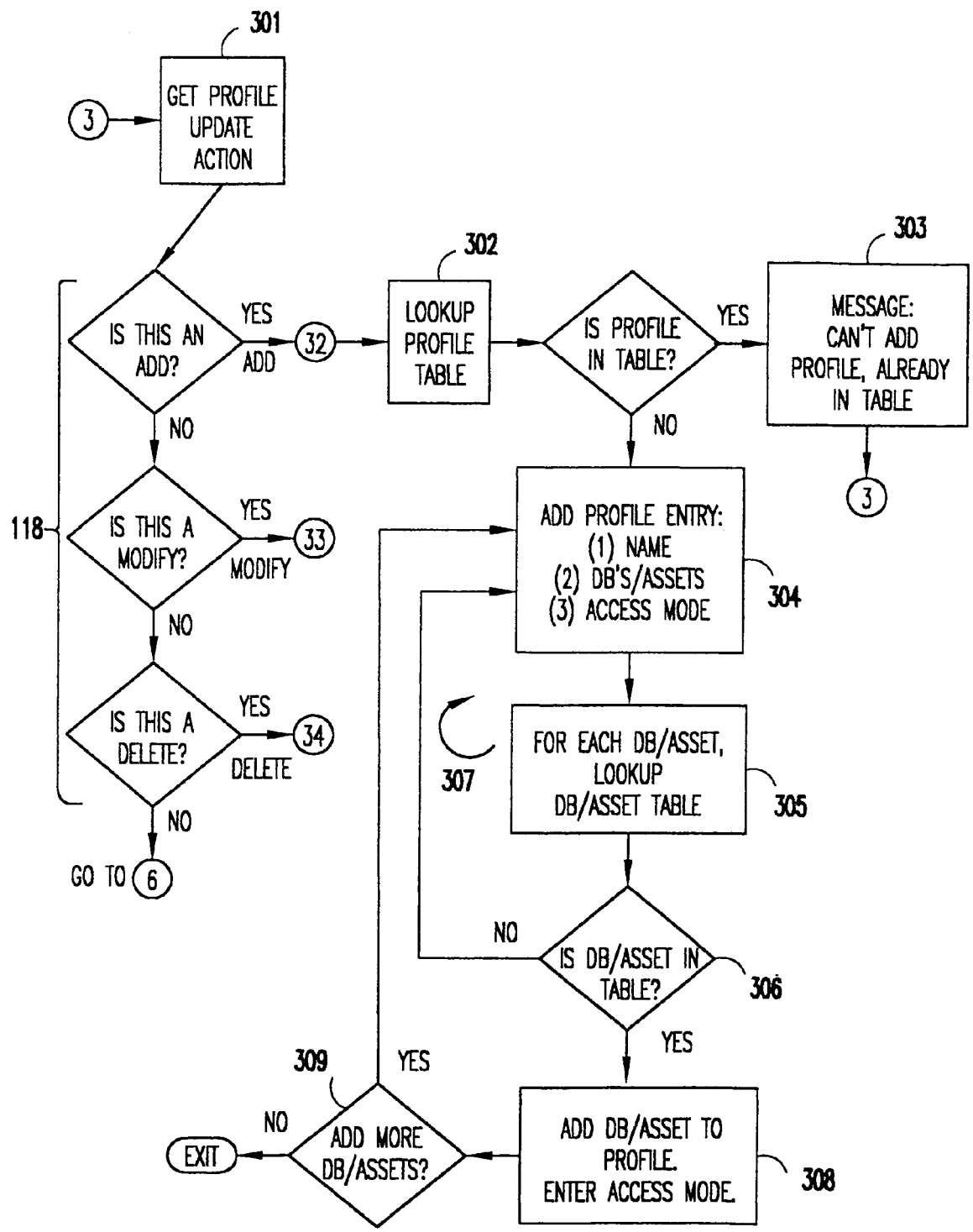
FIG. 7 is a flow chart depicting a system profile update: ADD routine in accordance with the present invention.

Specifically, as shown in FIG. 7 (and replicated in FIGS. 8 and 9), testing is done at 118 to determine the type of profile update action desired by the administrator. Prompting for this information is depicted at 301. Assuming that the administrator wishes to add a profile to the profiles previously defined (if any), the first task is to interrogate (302) the Profile Table by profile name to determine if the profile is already there. If the profile is already defined, the system returns the message (303) that the profile cannot be added because it is already in the table. If not, then the system proceeds with new profile entry process.

At step 304 of FIG. 7 the administrator enters the following information into the Profile Table, or can be prompted for it:
  (1) Profile name (ex. Engineer, Patent, BB, FF, etc.)
  (2) Profile description (ex. Design Engineer, Patent database, etc.)
  (3) Data base (or asset) id
  (4) Access mode for the data base (or asset) in this profile (R for read only, U for update) . . . etc. repeating pairs of Data base and Access mode.

This information corresponds to a single line of the profile table of FIG. 14 but may be of any arbitrary length. This information is checked for consistency with the DB/asset table of FIG. 15 (to be certain that the asset exists in the DB/asset table and that it is correctly and consistently defined) and any discrepancy detected at step 305 causes the process to loop to step 304 to resolve the conflict. When consistency of an entered asset with the DB/asset table is confirmed, the asset is entered into the profile and the administrator is prompted for any further DB/assets to be added to the profile at step 309 which loops to 304 to repeat the process until the administrator indicates completion and the process exits.

Figure 8:
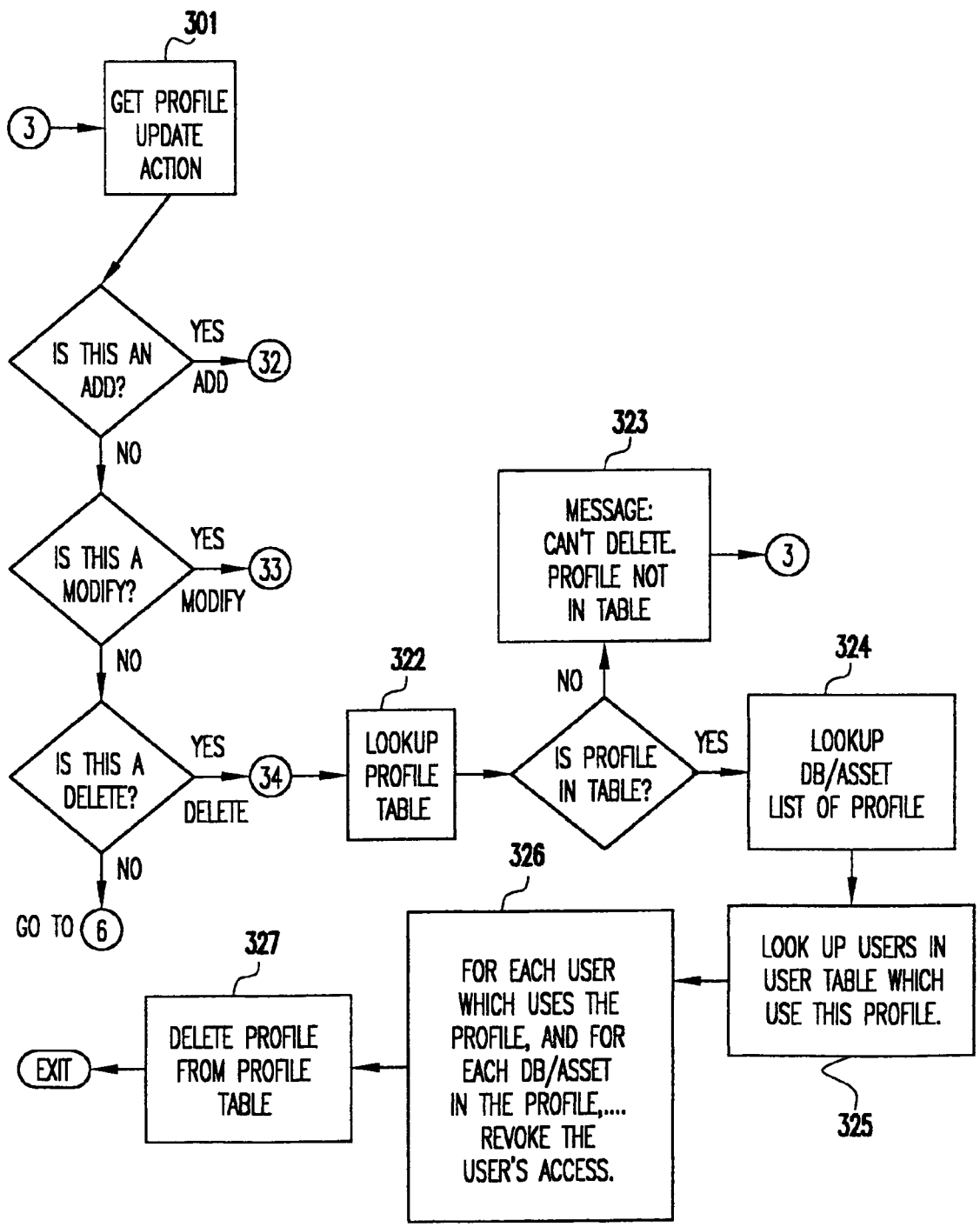
FIG. 8 is a flow chart depicting a system profile update: DELETE routine in accordance with the present invention.

A profile update deletion operation is illustrated in FIG. 8. Again, the first task is to interrogate the Profile Table to see if the profile to be deleted exists and a message is returned (323) that the profile cannot be deleted if it is not in the table. If the profile is in the table, the system proceeds with the profile deletion process. At step 324, the data bases (or assets) listed under the profile are retrieved from the profile table (FIG. 14) and, at step 325, all userIDs associated with the profile are retrieved from the user table (FIG. 13). Using this data, the system the revokes all user accesses to each DB/asset (step 326) and then deletes the profile entry from the profile table as illustrated in step 327.

Figure 9:
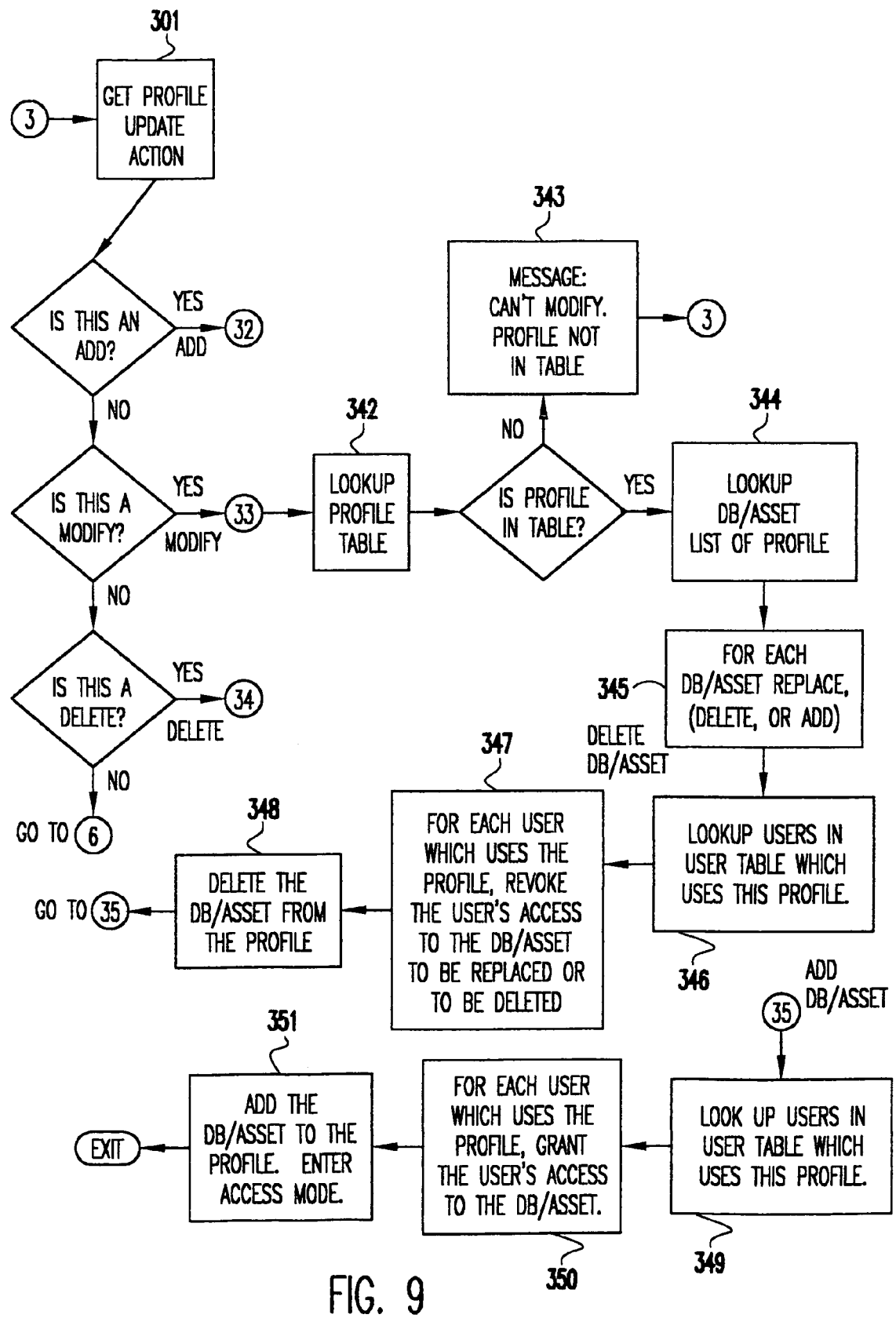
FIG. 9 is a flow chart depicting a system profile update: MODIFY routine in accordance with the present invention.

A profile modify operation is illustrated in FIG. 9 and is largely similar to the user list modify operation of FIG. 6, discussed above. Again, it is first determined if the profile exists in the profile table, returning a message that the profile cannot be modified if it is not found (step 343). If the profile is found, the DB/assets contained therein are retrieved at step 344 and the administrator is prompted for an indication of whether or not the asset is to be deleted or modified in regard to access mode as indicated by step 345. For each data base (or asset) or their particular access mode to be deleted or replaced, the DELETE DB/Asset sequence (steps 346, 347 and 348) is used. As with profile deletions, the userIDs corresponding to users in the user list (FIG. 13) to which the profile has been assigned are retrieved (step 346) and the access to a DB/asset to be deleted are revoked (step 347) and then the DB/asset is deleted from the profile (step 348). However, it should be noted that if only the access mode is removed or replaced, then conflict resolution will have to be done anew, reconciling the specific user's resolution mode if the same data base occurs in separate profiles which are assigned to the same userID.

Then the administrator is prompted for each data base (or asset) to be added or added-to-replace together with the particular access mode to be provided in this profile. DB/assets to be added to the profile can be retrieved from the DB/asset list and displayed as a menu for administrator selection. The list of users of the profile are retrieved (step 349) and access to the added DB/asset is granted with the associated access mode (step 350) and the DB/asset and access mode is added to the profile in the Profile table (step 351) from which all the DB/assets therein can be accessed when new users are added or additional accesses to the profile are granted, as discussed above.

Figure 10:
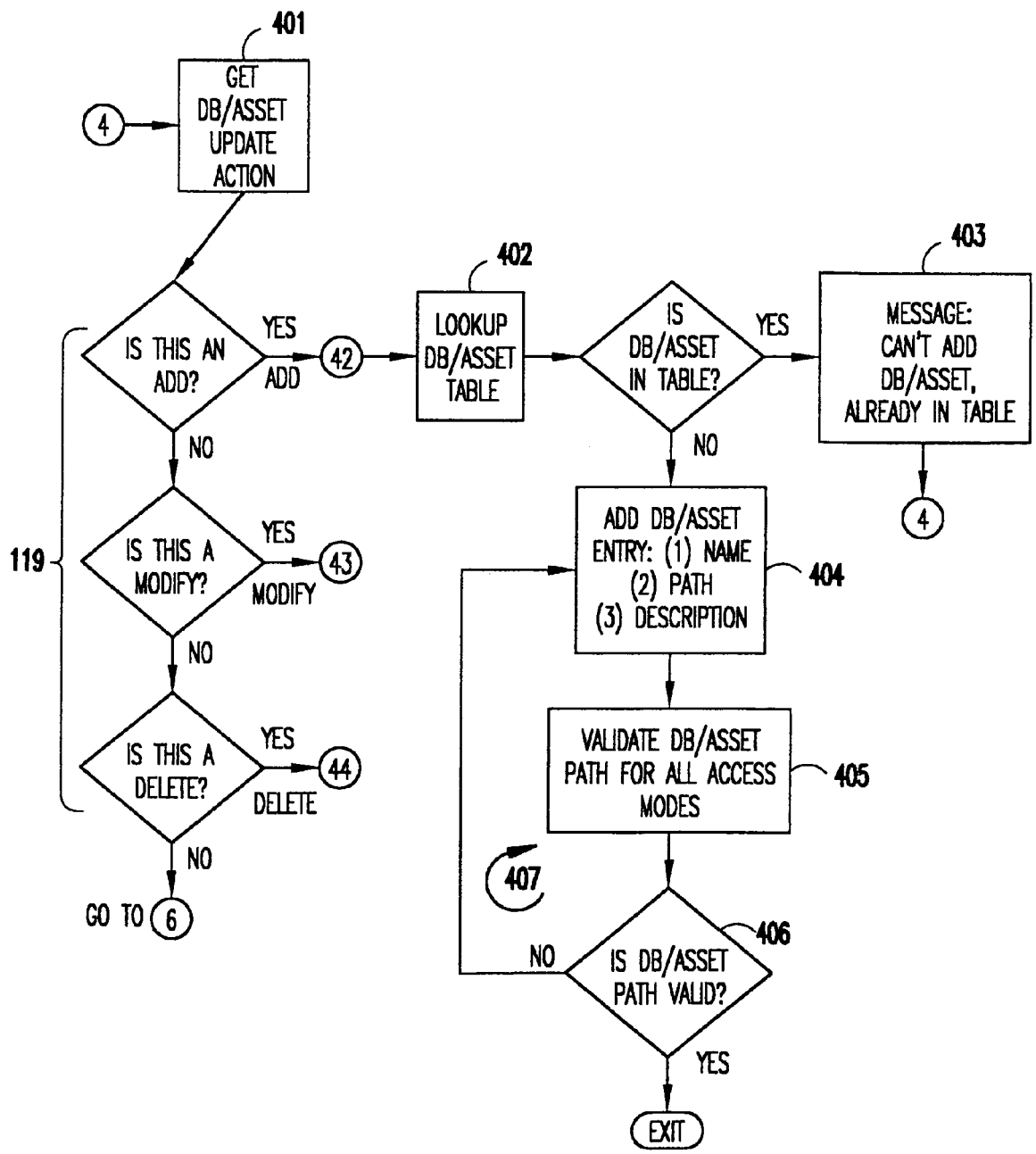
FIG. 10 is a flow chart depicting a system DB/asset update:ADD routine in accordance with the present invention.
Figure 11:
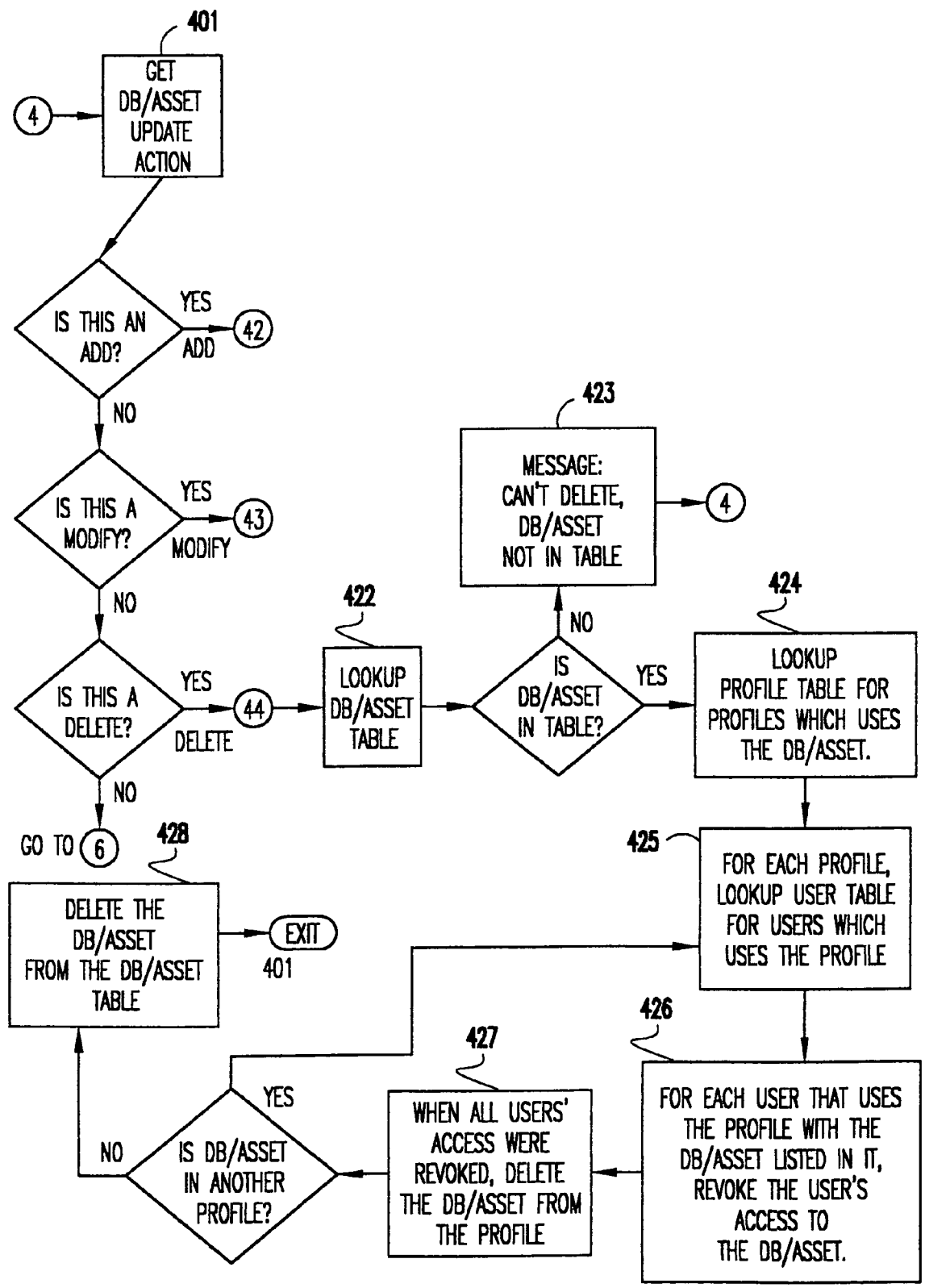
FIG. 11 is a flow chart depicting a system DB/asset update:DELETE routine in accordance with the present invention.
Figure 12:
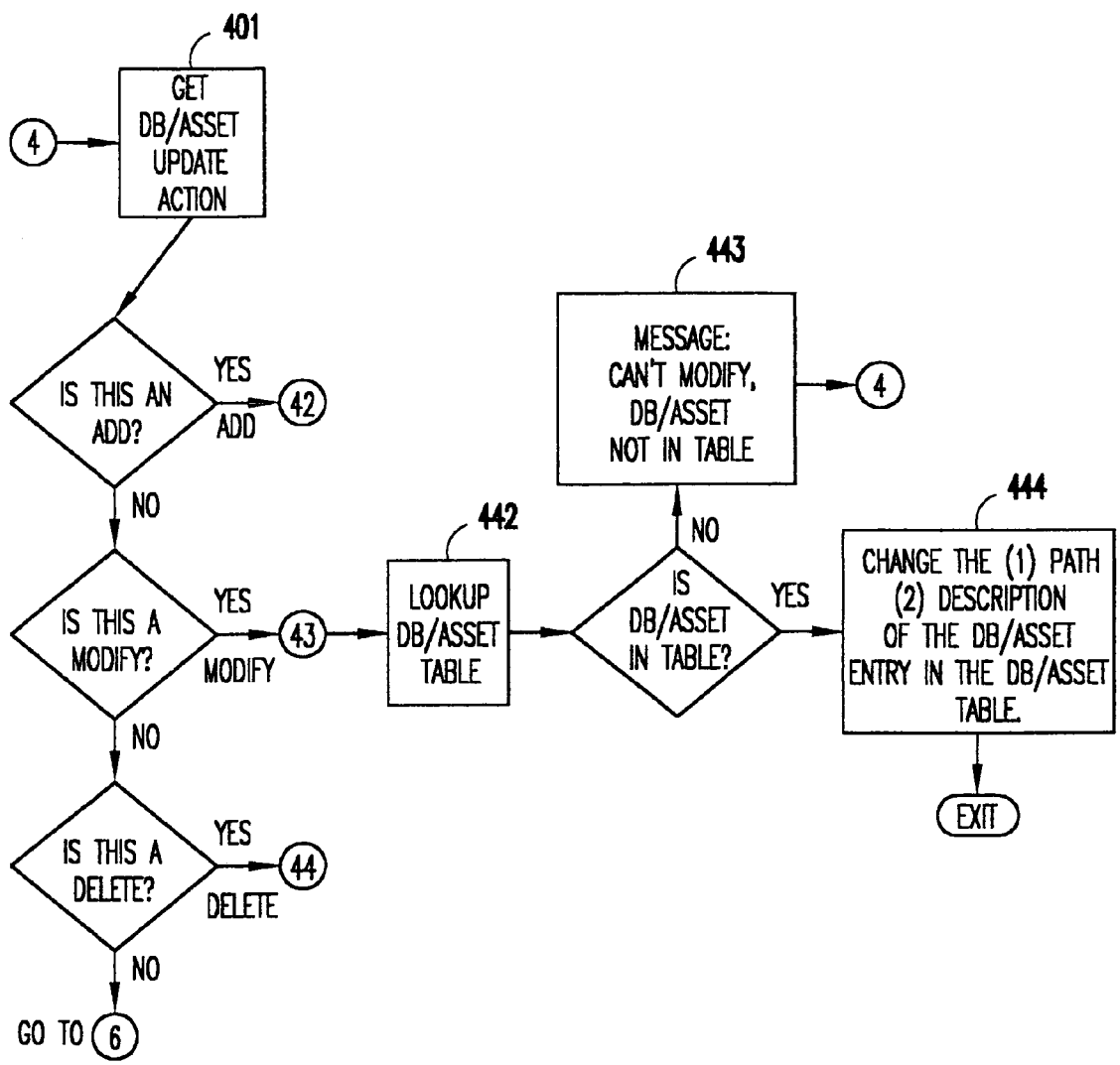
FIG. 12 is a flow chart depicting a system DB/asset update:MODIFY routine in accordance with the present invention, FIG. 13 schematically depicts fields of an exemplary user table in accordance with the invention, FIG. 14 schematically depicts fields of an exemplary profile table in accordance with the invention, and FIG. 15 schematically depicts fields of an exemplary DB/asset table in accordance with the invention.

Referring now to FIGS. 10–12, DB/asset update procedures to add, delete and modify the DB/asset table (FIG. 15) will now be discussed. Again, the administrator is preferably prompted for the type of update procedure to be performed and the response is tested (401, 119) to cause branching to the appropriate routine to accomplish the desired operation. If a DB/asset is to be added to the DB/asset table (FIG. 15), the first task is to access the DB/Asset Table, as shown at 402, to see if the data base or asset is already listed. If so, the message is returned (403) that the data base (or asset) cannot be added because it is already in the table. This process also prevents the same identification from being used for the same DB/asset even though the DB/asset may not be the same or the overwriting of one DB/asset by another.

If not, then the new data base (or asset) entry process can proceed by prompting the administrator for:

(1) Data base or Asset name (ex. 193, 355, ISO9000, Spec.txt)
(2) Data base or Asset description (ex. Quality Control data base)
(3) Data base (or asset) path (ex. xyz.com/afs/global/db902/)

as shown at step 404. At step 405, the path for access of the DB/asset is validated for all access modes to make certain that all potential access modes such as read, write, create, delete, general update, are executable and can take place. If the path is not valid, as determined at 406, the process loops to 404 for correction of the path entry. Otherwise, the process is complete and may exit the procedure.

Referring now to FIG. 11, a DB/asset delete operation is illustrated. The DB/asset to be deleted is checked against the DB/asset table (422) and, if not found, a message is returned (423) that the data base (or asset) cannot be deleted because it is not in the table. Otherwise, the data base (or asset) deletion process can proceed by interrogating the profile table (FIG. 14) for profiles which specify an access authorization for that DB/asset, as shown at 424. Then for each such profile, the user table (FIG. 13) is interrogated to determine the users of each profile. The access authorization commands to revoke the access authorization for the DB/asset for each such user are automatically generated and issued (426) and when complete, the DB/asset is removed from the profile at step 427 and the process loops to perform the same operations for the next profile in which the DB/asset appears. When the DB/asset has thus been deleted from all profiles, the DB/asset is deleted from the DB/asset table as shown at 428.

In should be noted that the DB/asset remains in the DB/asset table until all user authorizations have been deleted and the DB/asset has been deleted from all profiles (although the associations of the users with particular profiles remain unchanged). This procedure, and similar procedures described above are not essential to the practice of the invention but are much preferred to maintain the integrity of data in the user, profile and DB/asset tables. By using such procedures, no DB/assets can remain associated with the system unless some user can access it. By the same token, obsolete user authorizations and profile data are not allowed to remain in the system where an unintended access could be granted if a DB/asset were to be added having an identification which coincided with a pre-existing access authorization or profile entry which might proliferate such unintended access.

Referring now to FIG. 12, a DB/asset modify operation will be described. Once this operation is invoked by the administrator, as described above, the DB/Asset Table is interrogated to determine if the DB/asset to be modified is present. If not, a message is returned (443) that the data base (or asset) entry cannot be modified, because it is not in the table. Otherwise, the DB/Asset modify process is performed by editing the path and/or description entry in the DB/asset table as shown at 444. If the path is modified, it should be validated as described with reference to FIG. 10 (step 406). Modification of the identification of the DB/asset is not permitted. No modification of the user table or profile table is required since all authorizations and profile specifications should generally be left in place and, in any event, can be separately changed, if necessary, as described above.

It should be noted that changes in access path simply change the links at run-time when the exact path-link is looked-up. Modifying the path takes place when a data base (or asset) changes its physical location. For instance, a data base was moved from Boston to Denver, usually, that link path must be changed.

Referring now to FIGS. 13–15 the user, profile and DB/access tables will now be described in regard to the exemplary form thereof shown in these Figures. It should be appreciated that the format shown is schematic and the organization of data contained therein is not necessarily reflected therein and in any event, is unimportant to the successful practice of the invention other than permitting the processor to rapidly and reliably search the tables. Further, the fields shown are sufficient to the practice of the invention but other information can be included, if desired to support other functions of the system and some user information could be omitted without compromise of the functions described above.

The User Table of FIG. 13 contains the following fields:
(1) UserID
(2) Profile names (can be more than one)
(3) User's Resolution (min or max)
(4) User's employee serial number (or social security number)
(5) User's name
(6) User's department
(7) User's e-mail address
(8) User's manager's e-mail address
(9) Other information such as phone, job title, etc.

Of these fields, only the userID, profile, and resolve fields (1,2,3) are important to the practice of the invention.

The Profile Table illustrated in FIG. 14 contains the following fields:

(1) Profile name (ex. Engineer, Patent, BB, FF, etc.)
(2) Profile description (ex. Design Engineer, Patent database, etc.) and repeating pairs of
(3) Data base (or asset) id
(4) Access mode for the data base (or asset) in this profile (R for read only, U for update).

Of these fields, the Profile name, and the set of Data base (or asset) identifications, and access mode for each (1,3,4,5,6, 7,8, . . . . etc.) are important to the practice of this invention. However, as described above, the access mode may be supplied by default or by resolution of conflicts between access mode for a DB/asset appearing in more than one profile assigned to a user.

The DB/Asset Table of FIG. 15 contains the following fields:

(1) Data base or Asset name (ex. 193, 355, ISO9000, Spec.txt
(2) Data base or Asset description (ex. Quality Control data base)
(3) Data base (or asset) path (ex. xyz.com/afs/global/db902/).

Of these fields, the Data base or Asset name and the data base (or asset) path (1,3) are important to the practice of the invention.

In view of the foregoing, it is seen that the invention as described above provides substantial automation of the issuance of administrator commands and substantial user and administrator convenience while maintaining integrity of the user, profile and DB/asset tables. Profiles allow accesses to be granted or revoked in groups in accordance with groups of users and which can be modified at will. Profiles can be generated at will to accommodate unique access needs.

While the invention has been described in terms of a single preferred embodiment, those skilled in the art will recognize that the invention can be practiced with modification within the spirit and scope of the appended claims.

What is claimed is:

1. A method of operating a data processing system to control user access to a plurality of resources, said method including the steps of
    editing a list of resources,
    editing a list of access profiles, each said access profile in said list of access profiles containing a designation of at least one of said resources listed in said list of resources, and
    editing a list of users to add or delete, for a user of said list of users, an access profile designation for an access profile containing said designation of said at least one said resource, said list of users including, for each listed user, a security profile including a userID by which the user can be authenticated for one or more access profiles,
    wherein a level of said list of access profiles is logically between levels of said list of users and said list of resources in an architecture comprising said list of users, said list of access profiles and said list of resources, respectively.

2. A method as recited in claim 1, wherein all of said editing steps are performed under supervision of an administrator to the exclusion of users.

3. A method as recited in claim 1, including the further step of
    authorizing access of each user to selected resources included in said resource list in accordance with contents of profiles in said list of profiles which are associated with each user in said list of users.

4. A method as recited in claim 3, wherein said authorizing step is performed upon detection of a said editing step.

5. A method as recited in claim 4, wherein said detection is performed by comparison of said lists of users, profiles and resources with prior lists of users, profiles and resources.

6. A method as recited in claim 3, including the further steps of
    authenticating a user in accordance with said userID, and
    providing access to a resource, authorized by said authorizing step, which is selected by said user authenticated in said authenticating step.

7. A method as recited in claim 4, including the further steps of
    authenticating a user in accordance with said userID, and
    providing access to a resource, authorized by said authorizing step, which is selected by said user authenticated in said authenticating step.

8. A method as recited in claim 5, including the further steps of
    authenticating a user in accordance with said userID, and
    providing access to a resource, authorized by said authorizing step, which is selected by said user authenticated in said authenticating step.

9. A method as recited in claim 2, including the further step of
    authorizing access of each user to selected resources included in said resource list in accordance with contents of profiles in said list of profiles which are associated with each user in said list of users.

10. A method as recited in claim 9, wherein said authorizing step is performed upon detection of an editing step.

11. A method as recited in claim 10, wherein detection of an editing step is performed by comparison of said lists of users, profiles and resources with prior lists of users, profiles and resources.

12. A method as recited in claim 9, including the further steps of
    authenticating a user in accordance with said userID, and
    providing access to a resource, authorized by said authorizing step, which is selected by said user authenticated in said authenticating step.

13. A method as recited in claim 10, including the further steps of
    authenticating a user in accordance with said userID, and
    providing access to a resource, authorized by said authorizing step, which is selected by said user authenticated in said authenticating step.

14. A method as recited in claim 11, including the further steps of
    authenticating a user in accordance with said userID, and
    providing access to a resource, authorized by said authorizing step, which is selected by said user authenticated in said authenticating step.

15. A method as recited in claim 1, including the further step of deleting a resource from all profiles specifying a resource to be deleted from said resource list during said step of editing said list of resources.

16. A method as recited in claim 1, including the further step of deleting a profile from all users in said list of users for which a profile to be deleted from said profile list is specified during said step of editing said list of profiles.

17. A data processing system having a plurality of available resources, said system including a server, means for controlling access to said resources, said means for controlling access to said resources including a list of said resources, a list of access profiles, each access profile in said list of access profiles corresponding to at least one said resource listed in said list of resources, and a list of users containing security profile information for authenticating a user and at least one access profile information associated with each said user, said at least one access profile corresponding to said at least one resource whereby said security profile authenticates a user to said at least one resource specified in a said access profile information in said security profile for said user, and means for providing communication between a user and said server, wherein a level of said list of access profiles is logically between levels of said list of users and said list of resources in an architecture comprising said list of users, said list of access profiles and said list of resources, respectively.

18. A system as recited in claim 17, further including means for editing any of said list of users, said list of profiles and said list of resources.

19. A system as recited in claim 18, further including means for detecting editing of any of said list of users, said list of profiles and said list of resources.

20. A system as recited in claim 17, further including means for authorizing user access to selected ones of said resources in accordance with said profiles in said list of profiles and said users in said list of users.

21. A system as recited in claim 19, further including means for authorizing user access to selected ones of said resources in accordance with said profiles in said list of profiles and said users in said list of users responsive to said means for detecting editing.

22. A system as recited in claim 17, further including means for authenticating a user upon access by said user to said server.

23. A system as recited in claim 22, further including means for directing a user authenticated by said means for authenticating a user to a resource to which access of that user has been authorized by said authorizing means.

24. A system as recited in claim 23, wherein said means for directing is responsive to location or path data contained in said list of resources.

25. A system as recited in claim 24, wherein said path or address data is a URL.

26. A system as recited in claim 17, further including means for deleting a resource from all profiles specifying a resource to be deleted from said resource list.

27. A system as recited in claim 17, further including means for deleting a profile from all users in said list of users for which a profile to be deleted from said profile list is specified.

28. A computer readable medium containing code for operating a data processing system to control user access to a plurality of resources, said code implementing the steps of
    editing a list of resources,
    editing a list of access profiles, each said access profile in said list of access profiles containing a designation of at least one of said resources listed in said list of resources, and
    editing a list of users to add or delete, for a user, an access profile designation of an access profile containing said designation of said at least one said resource, said list of users including, for each listed user, a security profile including a userID by which the user can be authenticated for one or more access profiles,
    wherein a level of said list of access profiles is logically between levels of said list of users and said list of resources in an architecture comprising said list of users, said list of access profiles and said list of resources, respectively.

29. A computer readable medium as recited in claim 28, wherein said code requires all of said editing steps to be performed under supervision of an administrator to the exclusion of users.

30. A computer readable medium as recited in claim 28, further including code for implementing a step of authorizing access of each user to selected resources included in said resource list in accordance with contents of profiles in said list of profiles which are associated with each user in said list of users.

31. A computer readable medium as recited in claim 30, wherein a code section implementing said authorizing step is executed upon detection of a said editing step.

32. A computer readable medium as recited in claim 31, wherein a code section performing said detection compares said lists of users, profiles and resources with prior lists of users, profiles and resources.

33. A computer readable medium as recited in claim 30, further including code for implementing the steps of
    authenticating a user in accordance with said userID, and
    providing access to a resource, authorized by said authorizing step, which is selected by said user authenticated in said authenticating step.

34. A computer readable medium as recited in claim 33, wherein said code implementing said detection of an editing step compares said lists of users, profiles and resources with prior lists of users, profiles and resources.

35. A computer readable medium as recited in claim 34, further including code implementing the further steps of
    authenticating a user in accordance with said userID, and
    providing access to a resource, authorized by said authorizing step, which is selected by said user authenticated in said authenticating step.

36. A computer readable medium as recited in claim 28, further including code for implementing a step of
    deleting a resource from all profiles specifying a resource to be deleted from said resource list during said step of editing said list of resources.

37. A computer readable medium as recited in claim 28, further including code for implementing a step of deleting a profile from all users in said list of users for which a profile to be deleted from said profile list is specified during said step of editing said list of profiles.

* * * * *